(12) United States Patent
Olczak

(10) Patent No.: US 6,909,482 B2
(45) Date of Patent: Jun. 21, 2005

(54) DISPLAY SUBSTRATE WITH REFLECTIVE COLOR FILTERS

(75) Inventor: Eugene Olczak, Glenville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/248,024

(22) Filed: Dec. 11, 2002

(65) Prior Publication Data

US 2004/0114072 A1 Jun. 17, 2004

(51) Int. Cl.⁷ ............................................. G02F 1/1335
(52) U.S. Cl. ........................ 349/113; 349/96; 349/106
(58) Field of Search ........................... 349/113, 96, 106

(56) References Cited

U.S. PATENT DOCUMENTS

| | | | |
|---|---|---|---|
| 4,906,070 A | 3/1990 | Cobb, Jr. | 359/694 |
| 6,025,899 A * | 2/2000 | Fukunaga et al. | 349/115 |
| 6,163,358 A | 12/2000 | Nonaka et al. | 349/155 |
| 6,172,725 B1 | 1/2001 | Lengyel | 349/104 |
| 6,437,921 B1 | 8/2002 | Whitehead | 359/640 |
| 2003/0184694 A1 * | 10/2003 | Chang et al. | 349/113 |

FOREIGN PATENT DOCUMENTS

| | | |
|---|---|---|
| JP | 06130424 | 5/1994 |
| JP | 08292428 | 5/1996 |
| JP | 08334752 | 12/1996 |

OTHER PUBLICATIONS

International Search Report.

* cited by examiner

*Primary Examiner*—Dung T. Nguyen
(74) *Attorney, Agent, or Firm*—Foley & Lardner LLP

(57) ABSTRACT

An optical display device. The device includes a substrate having a source of light, the light from the source of light including a plurality of primary colors. The device also includes a modulation array comprising a plurality of modulation elements arranged to modulate light received from the source of light, each of the modulation elements comprising a portion of a liquid crystal layer. The device also includes a reflective color filter array having a plurality of color filters, each of the plurality of color filters arranged to correspond to a respective element of the modulation array, each of the plurality of color filters transmitting light having one of the primary colors and reflecting light of the remaining light having other of the primary colors back to the substrate, the reflective color filter array arranged relative to the substrate such that there are no layers which substantially absorb light of the primary colors between the substrate and the reflective color filter array. The device also includes a reflective panel which reflects the reflected light having the primary colors back towards the reflective color filter array.

4 Claims, 4 Drawing Sheets

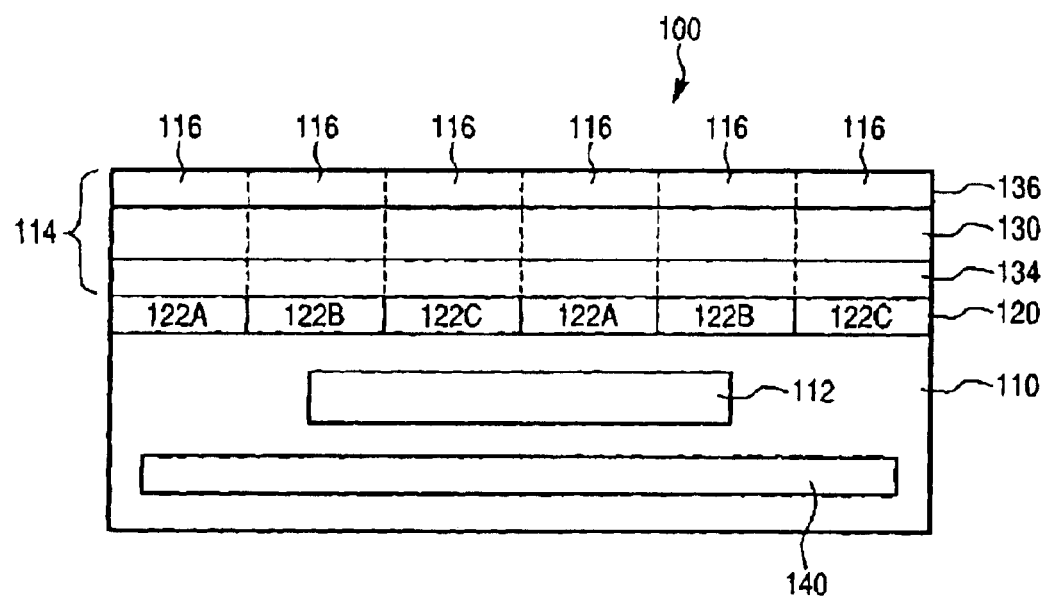

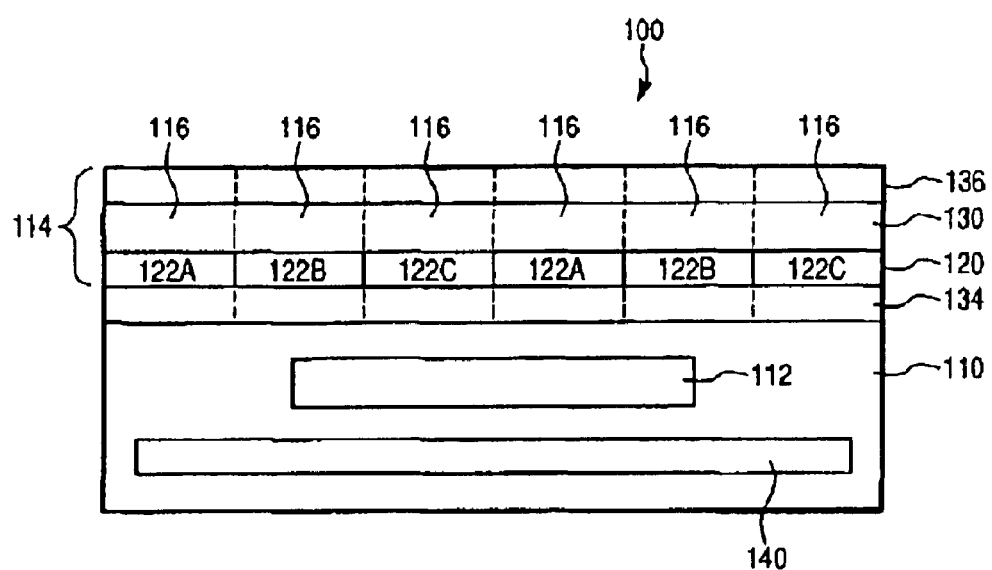

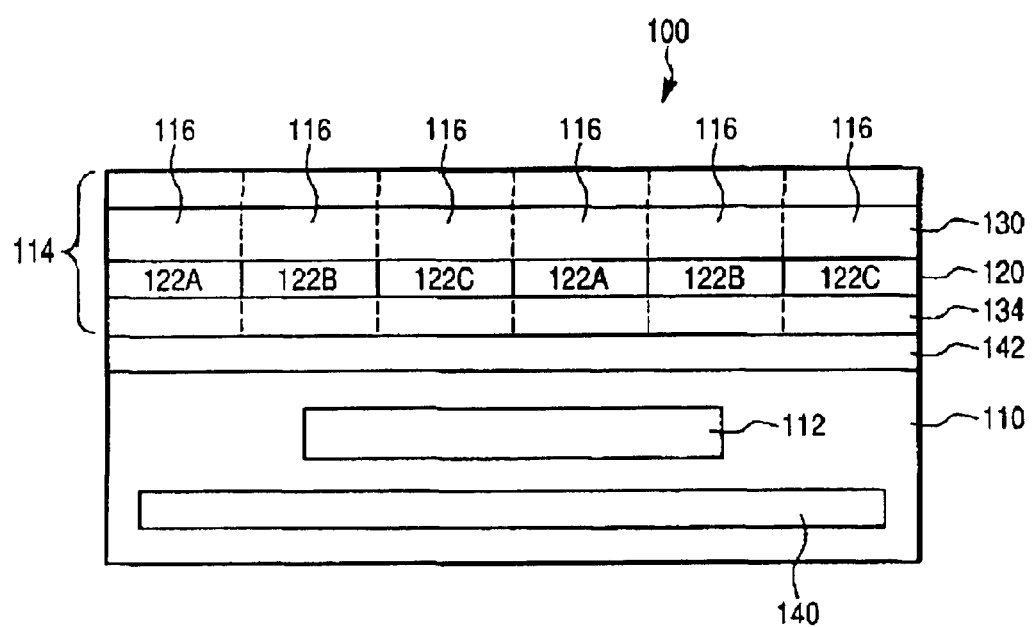

DISPLAY SUBSTRATE WITH REFLECTIVE COLOR FILTERS

BACKGROUND OF THE INVENTION

This invention is related generally to an optical display including a reflective color filter array (RFCA) liquid crystal display (LCD).

Color LCDs typically include a color filter array (CFA) mask which is used in generating color images. A broad range of colors may be achieved by spatially multiplexing each pixel into Red, Blue and Green colors (RGB) for example.

FIG. 1 illustrates an example of a typical color LCD with a color filter array. The color LCD 10 includes a substrate 12 having a light source 14, such as a gas discharge lamp. Light from the light source 14 is incident upon a display element 16 that acts to modulate the light in pixels. The display element 16 includes a liquid crystal layer 18 between two linear polarizers 20 and 22.

Regions of the liquid crystal layer 18 along with the polarizers 20 and 22 act as a light valve to selectively allow light to be transmitted from the light source 14 to the front of the LCD. For a normally black LCD, when a region of the layer 18 is turned on, such as by applying a voltage across the layer 18 at the region, light is allowed to pass through, otherwise light is blocked, and that pixel remains blocked. Thus, light may channeled through the different regions of the liquid crystal layer 18 by applying an appropriate voltage. Normally while LCDs are also known where the pixels pass light unless voltage is passed.

Color filters 24 of the CFA 26 are each disposed over discrete locations of the liquid crystal layer 18 (in a pixel pattern or mosaic). The filters are grouped as pixels to transmit the appropriate color light for the pixel. Each pixel typically comprises three subpixels (a triplet), where the filters corresponding to the subpixel transmitting red, green and blue light, respectively. Thus, each pixel includes a RGB (red, blue, green) triplet of filters.

The CFA 26 is shown in a side view with alternating filters 24r, 24b and 24g, which transmit red, blue, and green light, respectively.

SUMMARY OF THE INVENTION

In accordance with one aspect of the present invention, there is provided an optical display device. The optical display device comprises: a substrate comprising a source of light, the light from the source of light including a plurality of primary colors; a modulation array comprising a plurality of modulation elements arranged to modulate light received from the source of light; a reflective color filter array comprising a plurality of color filters, each of the plurality of color filters arranged to correspond to a respective element of the modulation array, each of the plurality of color filters transmitting light having one of the primary colors and reflecting light of the remaining light having other of the primary colors back to the substrate, the reflective color filter array arranged relative to the substrate such that there are no layers which substantially absorb light of the primary colors between the substrate and the reflective color filter array; and a reflective panel which reflects the reflected light having the primary colors back towards the reflective color filter array.

In accordance with another aspect of the present invention, there is provided an optical display device. The optical display device comprises: a substrate comprising a source of light, the light from the source of light including a plurality of primary colors; a modulation array comprising a plurality of modulation elements arranged to modulate light received from the source of light, each of the modulation elements comprising a portion of a liquid crystal layer; a reflective color filter array comprising a plurality of color filters, each of the plurality of color filters arranged to correspond to a respective element of the modulation array, each of the plurality of color filters transmitting light having one of the primary colors and reflecting light of the remaining light having other of the primary colors back to the substrate, the reflective color filter array arranged relative to the substrate such that there are no layers which substantially absorb light of the primary colors between the substrate and the reflective color filter array; and a reflective panel which reflects the reflected light having the primary colors back towards the reflective color filter array.

BRIEF DESCRIPTION OF THE DRAWINGS

FIG. 2 is a side view schematic of an optical display device according to one embodiment of the invention.

FIG. 3 is a side view schematic of an optical display device according to another embodiment of the invention.

FIG. 4 is a side view schematic of an optical display device according to another embodiment of the invention.

DETAILED DESCRIPTION OF THE PREFERRED EMBODIMENTS

Figure 1:
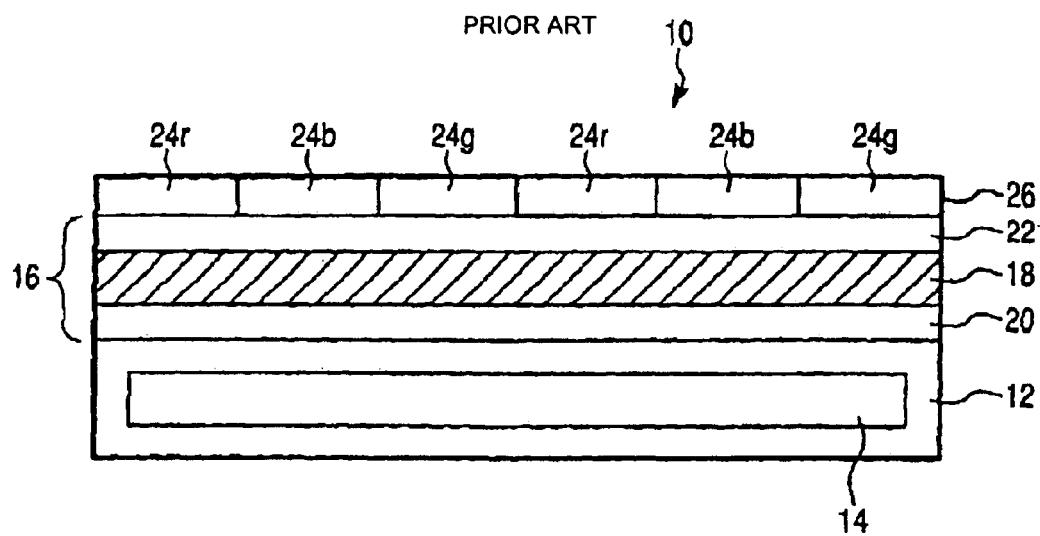
FIG. 1 is a schematic illustrating a conventional color LCD with a color filter array.

Reference will now be made in detail to presently preferred embodiments of the present invention. Wherever possible, the same reference numbers will be used throughout the drawings to refer to the same or like parts.

Although the CFA 26 of the typical design shown in FIG. 1 acts to transmit red, blue, and green light, the filters 24 are not designed and arranged for the purpose of reflecting light other than the light transmitted. The present inventor has realized that by arranging a reflective color filter array (RCFA) in a spatial location below any absorptive polarizers (or other substantially light absorbing layers) in a color LCD, or other light multiplexing display, the total illumination from the color LCD can be increased. In this arrangement, less light is wasted because any blue or green light that is incident on the red channel (if red, blue and green are chosen as the colors for the LCD) is reflected back to the substrate having the light source to be recycled (and similarly for the blue and green channels).

To accomplish the recycling, the substrate includes a reflective panel that allows the initially reflected light to be reflected back towards the RCFA, where it may possibly be transmitted at one of the filter locations.

In addition to color LCDs, the RFCA may be used in other devices where a color filter array is used, and where light is spatially modulated and multiplexed between the different colors of the filter array.

FIG. 2 is a side view schematic of an optical display device 100 according to one embodiment of the invention. The optical display device includes a substrate 110, which includes a light source 112. The substrate 110, which includes the light source 112, functions as a backlight for the optical display device 100. Disposed on the substrate 110 is a modulation array 114 comprising a plurality of modulating elements 116 arranged to modulate light received from the substrate 110. The modulating elements 116 are shown as bounded by the dashed lines in FIGS. 2, 3 and 4. Returning to FIG. 2, the optical display device includes a RCFA 120 which includes a number of color filters 122A, 122B and 122C which transmit light including a first primary color A, a second primary color B and a third primary color C, respectively. The color filters may be cholesteric filters, or may be comprised of organic or inorganic thin films, for example The color filters 122 may be arranged in groups of three primary colors (if the number of primary colors is three) as a triplet to form a pixel. The reflective color filter array may be made of an organic or an inorganic material. The reflective color filter array may comprise cholesteric filters or polarization sensitive filters.

These primary colors may be any desired colors, such as red, green and blue, for example. The primary colors may alternatively be cyan, magenta and yellow, for example. The number of primary colors, and thus the number of different types of filters in the RCFA, need not be three. The number of primary colors may be two or more than three, for example.

The light source 112 may be any conventional light source used for illumination in modulated light displays. The light source 112 may be, for example, a fluorescent light fixture, an incandescent light fixture, a halogen light fixture, or any other light source. The light source 112 may additionally include phosphors arranged such that they are activated by light from a light fixture, as is known in the art. In this case, the light fixture need not provide visible light and may provide UV light, for example, to excite the phosphor into emitting light. The light source 112 may include a number of different types of phosphors, where each type emits light at one of the primary colors of the filters 122 of the RCFA 120.

If the device 110 is a color LCD, the modulation array 114 may include a liquid crystal layer 130, and polarizers 134 and 136 disposed on either side of the liquid crystal layer. The polarizers 134 and 136 may be linear polarizers with polarization directions preferably oriented at 90° relative to each other. The liquid crystal layer 130 is preferably activated by a conventional LCD drive circuit (not shown), such as a circuit comprising thin film transistors. The liquid crystal layer 130 may comprise twisted nematic material as is known in the art.

In the embodiment of FIG. 2, the lower polarizer 134, i.e., the polarizer closer to the substrate 110, may be a reflective polarizer or an absorptive polarizer or a combination of both, and the upper polarizer 136, i.e., the polarizer further from the substrate 110, may be an absorptive polarizer. Appropriate materials for an absorptive polarizers include iodine dyed poly vinyl alcohol. For an absorptive polarizers the desired (linear) polarization is transmitted by the polarizer, and the undesired (orthogonal) polarization component is absorbed. For reflective polarizers absorb the undesired polarization is reflected rather than absorbed.

In this embodiment, the RCFA 120 is disposed below both polarizers 134 and 136. If the RCFA 120 would be disposed above one of the polarizers 134 and 136, and if both of these polarizers were absorptive, then the light reflected back from the RCFA 120 would tend to be absorbed by the lower polarizers, and this absorbed light could not then be recycled back up to the RCFA 120 to increase the illumination of the optical display device 100.

In this embodiment, the RCFA 120 is located below any light absorption layers which substantially absorb light at the primary colors of the filters, such as any optically absorptive polarizer. Thus, in this embodiment, there are no light absorption layers which substantially absorb light at the primary colors of the filters, where these light absorption layers are disposed between the RCFA 120 and the substrate light source 112.

Furthermore, the RCFA 120 is preferably located close to the modulation array 114 so that color cross talk is minimized, i.e., no mixing of the primary colors in a single modulator element at the modulation array. Having the RFCA 120 located outside the polarization modulation elements 116 avoids the problem of the color content of the images influencing the color content of the backlight illumination, such as when the reflected light is modulated by the image content of the LCD.

The substrate 110 also includes a reflective back panel 140. The reflective back panel can be formed of materials, for example, including polymer films with inorganic coatings or fillers, and may be metalized. The reflective back panel 140 acts to reflect the light that is reflected back from the RCFA 120. The reflective back panel 140 acts to reflect this light back up to the RCFA 120. The reflective panel 140 preferably has a reflectance at the primary colors of greater than 75%, and more preferably greater than 90%. Thus, the reflective back panel 140 recycles the light reflected back from the RCFA 120, and thus can act to increase the overall illumination of the optical display device 100.

The embodiment of FIG. 2 illustrates both the lower polarizer 134 and the upper polarizer to be above the RCFA 120. The lower polarizer 134, however, need not be above the RCFA 120 if the lower polarizer does not substantially absorb light at the primary colors from the RCFA 120.

FIG. 3 illustrates an embodiment where the lower polarizer 134 is a reflective polarizer and is disposed below the RCFA 120. As in the embodiment of FIG. 2, the RCFA 120 is still disposed below the upper polarizer 136, which may be an absorptive polarizer, and the liquid crystal material 130. Because the lower polarizer 134 is a reflective polarizer, which does not substantially absorb light of the primary colors, the light reflected back from the RCFA 120 can be recycled by being reflected by the reflective panel 140.

The optical display device 100 may include layers between the RCFA 120 and the back reflective panel 140 as long as these layers are not substantially absorptive at the primary colors. FIG. 4 illustrates another embodiment of the invention, where both a lower polarizer 134, which is a reflective polarizer, and an interlayer 142 are disposed between the RCFA 120 and the back reflective panel 140. Thus, light reflected back by the RCFA 120 at the primary colors can be reflected back up (and thus recycled) to the RCFA 120 without substantial absorption by layers between the RCFA 120 and the reflective panel 140. In this case the lower polarizer 134, and the interlayer 142 are not are not substantially absorptive at the primary colors. The interlayer 142 may be a passivation layer for example, and may comprise, for example, thin films such as polymers, SiO2, TiO2, and polysilcon.

Alternatively, the interlayer 142 may be a layer performing functions other than or in addition to passivation. These functions include, for example, electric or thermal conduction, electric or thermal shielding or environmental barrier or any combinations thereof. While FIG. 4 illustrates the interlayer 142 disposed between the RCFA 120 and the substrate 110, which includes the light source 112, the interlayer 142 may alternately or additionally be disposed on a side of the RCFA 120 opposite to the light source 112. Furthermore, the devices as described with respect to FIGS. 2 and 3 may also include one or more interlayers.

While the invention has been described in detail and with reference to specific embodiments thereof, it will be apparent to one skilled in the art that various changes and modifications can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An optical display device comprising:
   a substrate comprising a source of light, the light from the source of light including a plurality of primary colors;
   a modulation array comprising a plurality of modulation elements arranged to modulate light received from the source of light;
   a reflective color filter array comprising a plurality of color filters, each of the plurality of color filters arranged to correspond to a respective element of the modulation array, each of the plurality of color filters transmitting light having one of the primary colors and reflecting light of the remaining light having other of the primary colors back to the substrate, the reflective color filter array arranged relative to the substrate such that there are no layers winch substantially absorb light of the primary colors between the substrate and the reflective color filter array; and
   a reflective panel winch reflects the reflected light having the primary colors back towards the reflective color filter array,
   wherein the modulation array comprises a reflective polarizer, and wherein the reflective color filter array is disposed between the reflective polarizer and the substrate.

2. An optical display device comprising:
   a substrate comprising a source of light, the light from the source of light including a plurality of primary colors;
   a modulation array comprising a plurality of modulation elements arranged to modulate light received from the source of light;
   a reflective color filter array comprising a plurality of color filters, each of the plurality of color filters arranged to correspond to a respective element of the modulation array, each of the plurality of color filters transmitting light having one of the primary colors and reflecting light of the remaining light having other of the primary colors back to the substrate, the reflective color filter array arranged relative to the substrate such that there are no layers which substantially absorb light of the primary colors between the substrate and the reflective color filter array; and
   a reflective panel which reflects the reflected light having the primary colors back towards the reflective color filter array,
   wherein the modulation array comprises an optically absorptive polarizer disposed over the reflective color filter array,
   wherein the modulation array comprises a reflective polarizer, and wherein the reflective color filter array is disposed between the reflective polarizer and the substrate.

3. An optical display device comprising:
   a substrate comprising a source of light, the light from the source of light including a plurality of primary colors;
   a modulation array comprising a plurality of modulation elements arranged to modulate light received from the source of light, each of the modulation elements comprising a portion of a liquid crystal layer;
   a reflective color filter array comprising a plurality of color filters, each of the plurality of color filters arranged to correspond to a respective element of the modulation array, each of the plurality of color filters transmitting light having one of the primary colors and reflecting light of the remaining light having other of the primary colors back to the substrate, the reflective color filter array arranged relative to the substrate such that there are no layers which substantially absorb light of the primary colors between the substrate and the reflective color filter array; and
   a reflective panel which reflects the reflected light having the primary colors back towards the reflective color filter array,
   wherein the modulation array comprises a reflective polarizer, and wherein the reflective color filter array is disposed between the reflective polarizer and the substrate.

4. An optical display device comprising:
   a substrate comprising a source of light, the light from the source of light including a plurality of primary colors;
   a modulation array comprising a plurality of modulation elements arranged to modulate light received from the source of light, each of the modulation elements comprising a portion of a liquid crystal layer;
   a reflective color filter array comprising a plurality of color filters, each of the plurality of color filters arranged to correspond to a respective element of the modulation array, each of the plurality of color filters transmitting light having one of the primary colors and reflecting light of the remaining light having other of the primary colors back to the substrate, the reflective color filter array arranged relative to the substrate such that there are no layers which substantially absorb light of the primary colors between the substrate and the reflective color filter array; and
   a reflective panel which reflects the reflected light having the primary colors back towards the reflective color filter array,
   wherein the modulation array comprises a reflective polarizer disposed between the reflective color filter array and the substrate,
   wherein the modulation array comprises a reflective polarizer, and wherein the reflective color filter array is disposed between the reflective polarizer and the substrate.

* * * * *